March 26, 1940. W. LA HODNY ET AL 2,194,758
MIRROR
Original Filed June 3, 1937

INVENTOR
William La Hodny
and Paul Bertell
by Popps and Popp
ATTORNEYS

Patented Mar. 26, 1940

2,194,758

UNITED STATES PATENT OFFICE 2,194,758

MIRROR

William La Hodny and Paul Bertell, Buffalo, N. Y., assignors to Standard Mirror Company, Inc., Buffalo, N. Y., a corporation of New York Original application June 3, 1937, Serial No. 146,219. Divided and this application July 15, 1938, Serial No. 219,376

1 Claim. (Cl. 88—98)

This invention relates to a mirror and more particularly to a vanity mirror of the type adapted to be attached to the sun shield of an automobile so that by swinging the sun shield down the mirror is available to the passengers or to the driver for observing themselves.

This application is a division of our patent application for Mirror, Serial No. 146,219, filed June 3, 1937.

One of the principal objects of this invention is to provide a mirror of substantial face dimensions but of relatively small thickness which can be readily attached to the sun visor of an automobile. The sun visors or shields of an automobile usually consist of upholstered panels which are hinged at one edge to the roof of the car near the wind shield so that they can be swung down to prevent the rays of the sun in the late afternoon or early morning from shining into the eyes of the occupants of the front seat of the automobile and render the driving uncomfortable. In accordance with the present invention the mirror panel is backed by a metal frame to which clips are attached that embrace the sun visor so that the vanity mirror can be attached by the simple expedient of slipping the mirror into position after which it is held in such position by the clips.

Another object of the present invention is to provide such a vanity mirror which is simple and inexpensive in construction and of pleasing appearance and in which the clips are attached to the metal back by passing them through the marginal portion of the metal back and securing them to the inner or concealed face thereof. By this means the metal back is perfectly flat and lies snugly against the sun shield and at the same time the clips are firmly secured in a position in which they project outwardly to grasp the edges of the sun shield.

Another object of the invention is to provide an economical connection between the clips and the metal mirror back, this being effected by forming eyelets in the metal back which extend through openings provided in the attaching portions of the clips.

Figure 1:
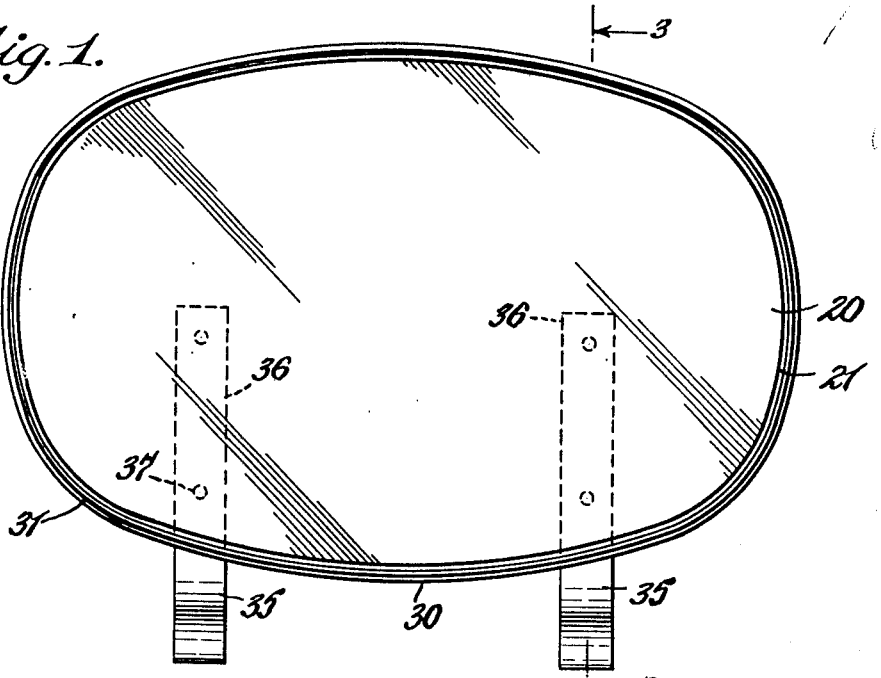
Fig. 1 is a front elevation of a vanity mirror made in accordance with our invention and adapted to be attached to the usual sun shield of an automobile.
Figure 2:
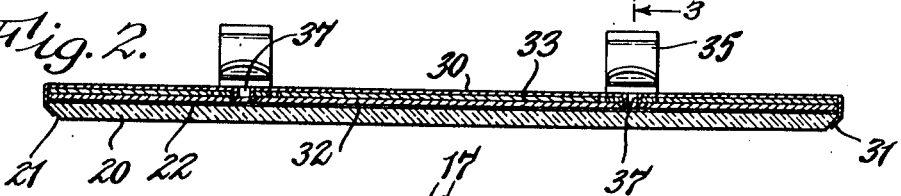
Figs. 2 and 3 are sections taken on the correspondingly numbered lines on Fig. 1.
Figure 3:
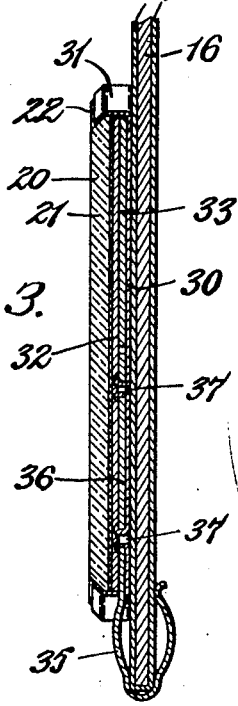

The vanity mirror is adapted to be attached to the sun shield 15 of an automobile. As is well known, these sun shields generally comprise a body member 16 made of any suitable material and usually covered on its opposite faces with fabric 17. The sun shields are usually hinged to the underside of the roof of the automobile near the wind shield in a position to be swung up against the roof when not in use or to be swung down to eliminate the glare of the sun in the late afternoon.

The vanity mirror is adapted to be clipped to the free edge of the sun shield in such manner as to be held against the rear or upper face of the sun shield. By this means when it is desired to use the vanity mirror it is merely necessary to swing the sun shield down, thus exposing the vanity mirror and rendering it accessible for use.

The vanity mirror shown comprises a glass panel 20 which is shown as being of elongated, rounding form and beveled at its edges as indicated at 21. The back of this glass plate is silvered, as indicated at 22. This silvering can extend over the entire rear face of the glass plate or it can be applied only to selected portions thereof, as more fully set forth in our said patent application Ser. No. 146,219 for the purposes therein stated. It will be understood that by silvering is meant the application of a reflective coating either metallic or non-metallic.

The mirror panel is held by a backing plate 30 which is made of metal and has its edges 31 spun around the bevel 21 of the glass panel 20 so as to securely hold the glass panel. One or more paper sheets or disks 32, 33 are interposed between the glass panel 20 and the backing plate 30 to form a cushioned mounting for the glass panel. The means whereby the mirror assembly is attached to the sun shield 15 comprises a pair of clips 35, each being formed to engage under and clip the lower or free edge of the sun shield and having an elongated, flat, attaching portion 36 which projects through an opening in the lower rim 31 of the backing plate and lies between the glass panel 20 and the backing plate 30. The attaching portions 36 can be secured to the backing plate 30 in any suitable manner as by forming thimbles or grommets 37 in the backing plate, these thimbles extending through openings provided in the attaching portions 36 and having their forward edges turned over to securely unite the two parts. It will be observed that one or more of the paper cushioning sheets 32, 33 are cut away at the places at which they register with the attaching portions 36 of the clips so as to provide a flat cushioned backing for the glass mirror panel.

From the foregoing it is apparent that the present invention provides an extremely simple and attractive vanity mirror construction which is inexpensive to produce and can be hinged to the sun visor of an automobile by simply slipping it into position. The construction is also very durable and the clips are securely attached in position and at the same time do not interfere either with the flat application of the vanity mirror to the sun shield or with the flat cushioned mounting for the glass mirror panel.

We claim as our invention:

A mirror, comprising a glass panel, a reflective coating on the rear face of said panel, a backing plate for said panel and having its edges spun around the margin of said panel to provide a unitary structure having narrow marginal walls, a pair of spaced clips secured to said backing plate and including flat portions interposed between said backing plate and the glass panel and secured to the front face of said backing plate and portions extending outwardly through openings in one of said narrow marginal walls of said backing plate and providing reversely bent portions, said reversely bent portions extending toward the centerline of said backing plate and being disposed generally parallel with the plane of the backing plate whereby said structure can be clipped to the edge of a sun shield or the like and a cushioning sheet of resilient material interposed between said glass panel and backing plate, said sheet of resilient material being cut to fit around the flat portions of said pair of spaced clips.

WILLIAM LA HODNY.
PAUL BERTELL.